United States Patent
Benenson et al.

(10) Patent No.: US 9,818,025 B2
(45) Date of Patent: Nov. 14, 2017

(54) DISCRIMINATION CONTAINER GENERATION DEVICE AND PATTERN DETECTION DEVICE

(75) Inventors: Rodrigo Benenson, Leuven (BE); Markus Mathias, Leuven (BE); Radu Timofte, Leuven (BE); Luc Van Gool, Antwerp (BE); Ryuji Funayama, Yokohama (JP)

(73) Assignees: TOYOTA JIDOSHA KABUSHIKI KAISHA, Toyota-shi, Aichi (JP); KATHOLIEKE UNIVERSITEIT LEUVEN, Leuven (BE)

( * ) Notice: Subject to any disclaimer, the term of this patent is extended or adjusted under 35 U.S.C. 154(b) by 260 days.

(21) Appl. No.: 14/407,381

(22) PCT Filed: Jun. 14, 2012

(86) PCT No.: PCT/JP2012/065283
§ 371 (c)(1),
(2), (4) Date: Jan. 29, 2015

(87) PCT Pub. No.: WO2013/186906
PCT Pub. Date: Dec. 19, 2013

(65) Prior Publication Data
US 2015/0139490 A1    May 21, 2015

(51) Int. Cl.
*G06K 9/00* (2006.01)
*G06K 9/46* (2006.01)

(52) U.S. Cl.
CPC ..... *G06K 9/00369* (2013.01); *G06K 9/00523* (2013.01); *G06K 9/46* (2013.01); *G06T 2207/30196* (2013.01)

(58) Field of Classification Search
None
See application file for complete search history.

(56) References Cited

U.S. PATENT DOCUMENTS

| 8,953,888 B2 * | 2/2015 | Kohli | G06K 9/00369 |
| | | | 382/190 |
| 2004/0258307 A1 * | 12/2004 | Viola | G06K 9/00369 |
| | | | 382/190 |

(Continued)

FOREIGN PATENT DOCUMENTS

| JP | 2003322521 A | 11/2003 |
| JP | 2008102593 A | 5/2008 |

(Continued)

OTHER PUBLICATIONS

Park et al. "Multiresolution models for object detection," Proc. European Conf. Computer Vision, 2010.*

(Continued)

*Primary Examiner* — Matthew Bella
*Assistant Examiner* — Soo Shin
(74) *Attorney, Agent, or Firm* — Sughrue Mion, PLLC

(57) ABSTRACT

A discriminator generation device 10 includes a feature quantity extraction unit 13 which, using at least two pattern groups having patterns of different sizes for a detection object, extracts a feature quantity of patterns configuring each pattern group, and a discriminator generation unit 14 which generates a discriminator for detecting a detection object of a size corresponding to each pattern group in an image based on the feature quantity of the patterns of each pattern group.

14 Claims, 14 Drawing Sheets

(56) References Cited

U.S. PATENT DOCUMENTS

| | | | |
|---|---|---|---|
| 2008/0056580 A1 | 3/2008 | Okada et al. | |
| 2009/0010495 A1* | 1/2009 | Schamp | B60R 21/0134 |
| | | | 382/106 |
| 2009/0097711 A1* | 4/2009 | Chen | G06K 9/00228 |
| | | | 382/103 |
| 2010/0103279 A1 | 4/2010 | Shiratani | |
| 2010/0205177 A1 | 8/2010 | Sato et al. | |
| 2011/0234422 A1* | 9/2011 | Yamashita | B60Q 5/006 |
| | | | 340/901 |
| 2011/0255741 A1* | 10/2011 | Jung | G06K 9/00369 |
| | | | 382/103 |
| 2013/0058535 A1* | 3/2013 | Othmezouri | G06K 9/00369 |
| | | | 382/103 |

FOREIGN PATENT DOCUMENTS

| | | |
|---|---|---|
| JP | 2009010828 A | 1/2009 |
| JP | 2010165053 A | 7/2010 |
| KR | 10-2008-0012770 A | 2/2008 |

OTHER PUBLICATIONS

Pedersoli et al. "A coarse-to-fine approach for fast deformable object detection," IEEE Conference on Computer Vision and Pattern Recognition (CVPR), 2011.*

Dollar et al. "Pedestrian Detection: An Evaluation of the State of the Art," IEEE Transactions on Pattern Analysis and Machine Intelligence, vol. 34, No. 4, Apr. 2012.*

Petrovskaya et al. "Awareness of Road Scene Particpants for Autonomous Driving," in Handbook of Intelligent Vehicles, A. Eskandarian, Ed. Springer, 2012, pp. 1383-1432.*

Paul Viola et al, "Robust Real-Time Face Detection", International Journal of Computer Vision, vol. 57, No. 2, Dec. 31, 2004, p. 137-p. 154.

Dollar et al., "Integral Channel Features", Copyrighted 2009, pp. 1-11.

Dollar et al., "The Fastest Pedestrian Detector in the West", BMVA Press, Sep. 2010, pp. 1-11.

Benenson R et al, "Pedestrian detection at 100 frames per second", Computer Vision and Pattern Recognition, May 21, 2012, p. 2903-p. 2910, XP032232416.

Anonymous, "Pedestrian detection at 100 frames per second—ESAT KU Leuven", May 21, 2012, p. 1 XP055213950.

Piotr Dollar et al, "The Fastest Pedestrian Detector in the West", Proceedings of the British Machine Vision Conference 2010, Jan. 1, 2010, p. 68.1-p. 68.11, XP055213952.

Dennis Park et al, "Multiresolution Models for Object Detection", Computer Vision—ECCV 2010, Sep. 5, 2010, p. 241-p. 254, XP019150739.

Marco Pedersoli et al, "A coarse-to-fine approach for fast deformable object detection", Computer Vision and Pattern Recognition, Jun. 20, 2011, p. 1353-p. 1360, XP032038170.

* cited by examiner

*Fig.1*
(a)
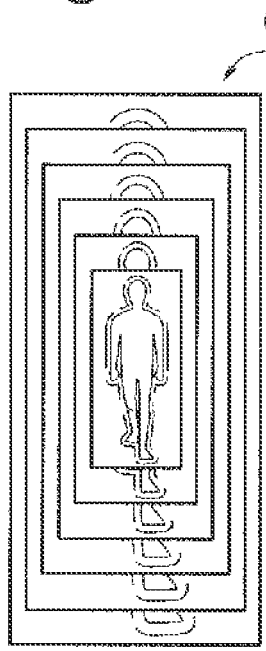
N
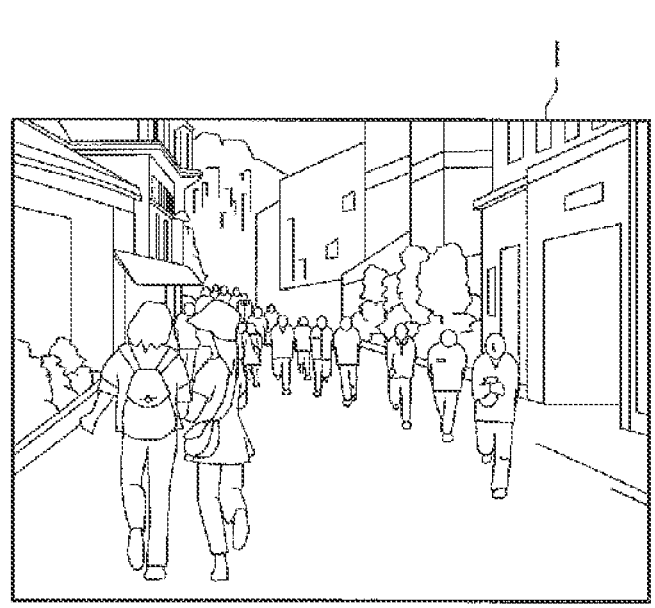
1
(b)
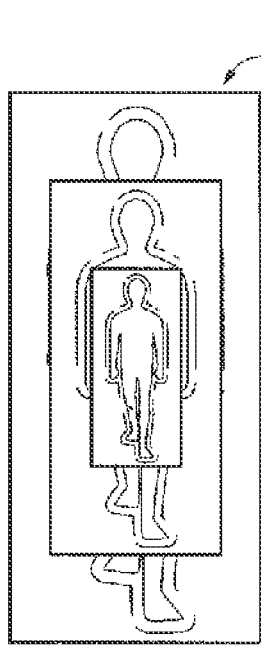
N'(<N)
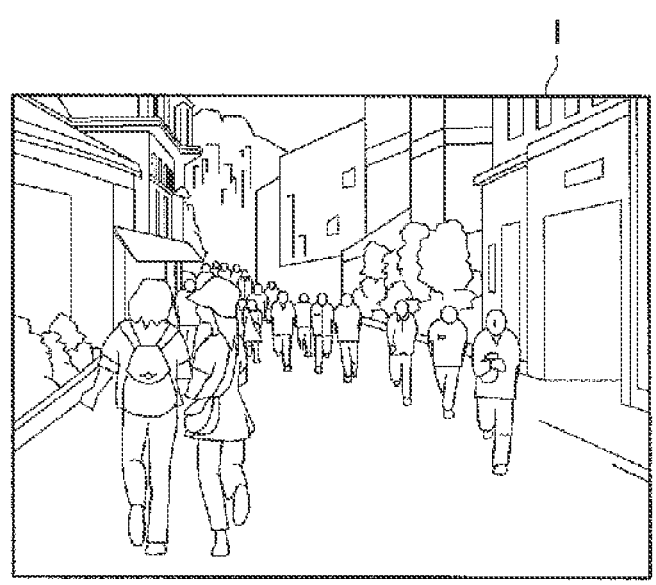
1

Fig.12
(a)
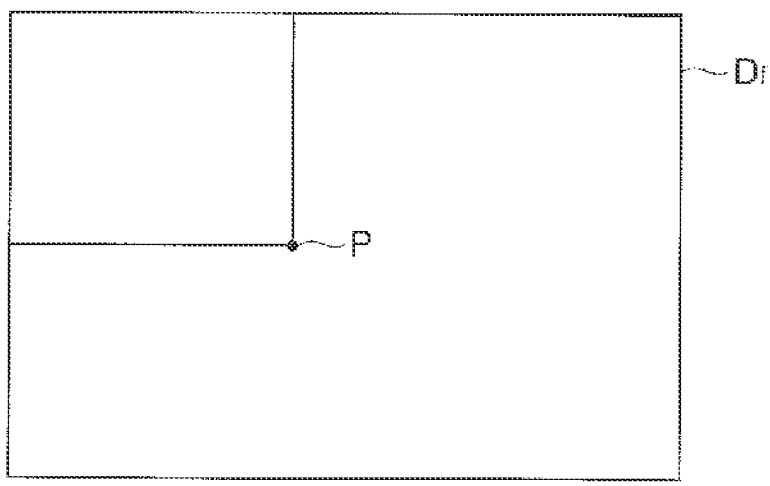
(b)
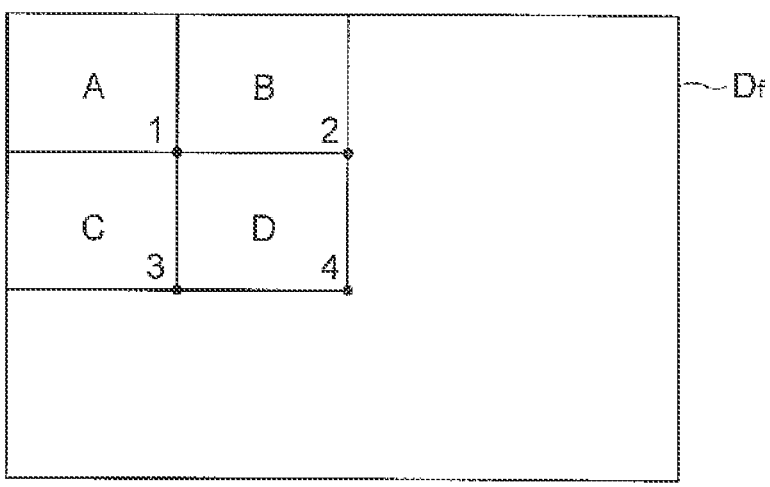

Fig.13
(a)
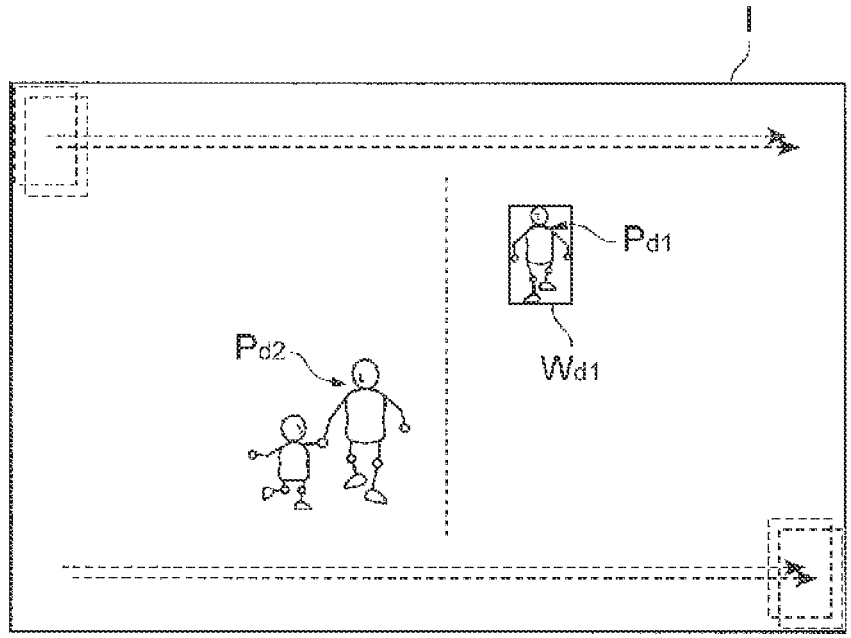
(b)
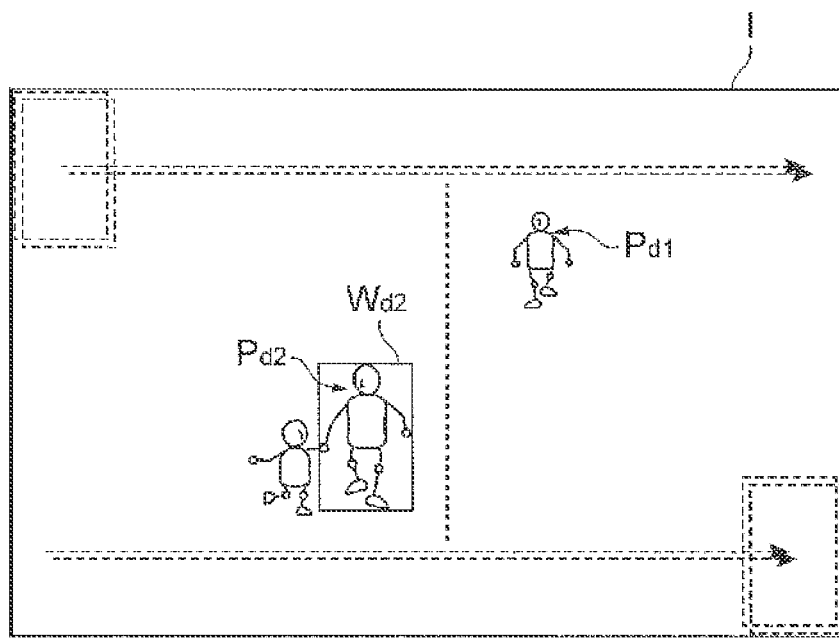

Fig.14
(a)
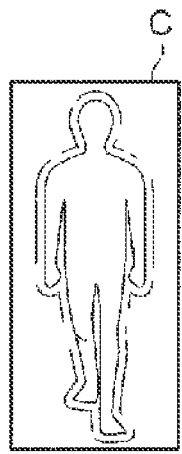
C
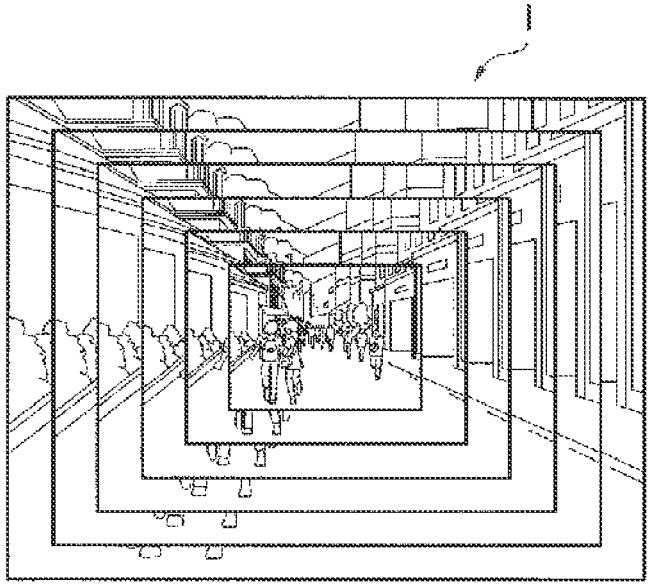
I
1      N
(b)
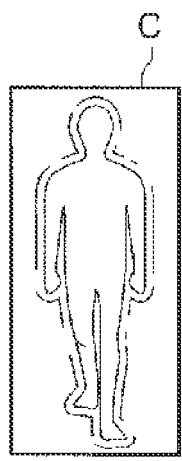
C
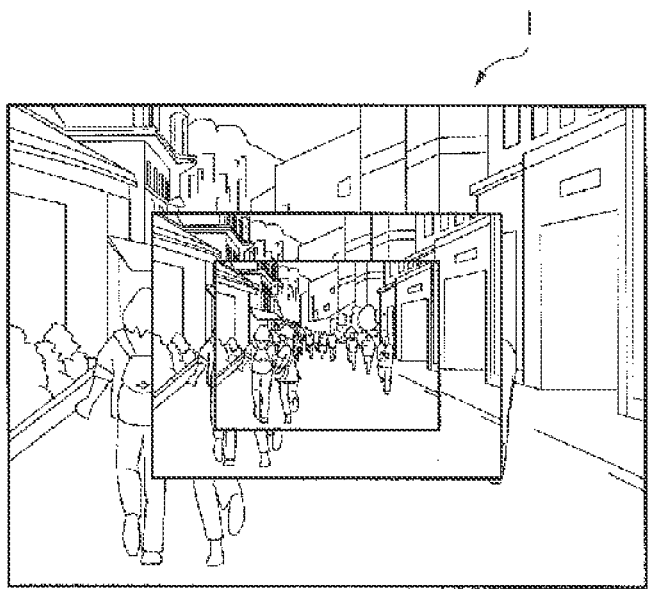
I
1      N'(<N)

DISCRIMINATION CONTAINER GENERATION DEVICE AND PATTERN DETECTION DEVICE

CROSS REFERENCE TO RELATED APPLICATIONS

This application is a National Stage of International Application No. PCT/JP2012/065283, filed on Jun. 14, 2012, the contents of all of which are incorporated herein by reference in their entirety.

TECHNICAL FIELD

The present invention relates to a discriminator generation device and a pattern detection device.

BACKGROUND ART

In the related art, a pattern detection device which detects a detection object in an image by pattern recognition has been known. The pattern detection device includes a discriminator generated by a discriminator generation device (pattern learning device).

On the other hand, in a pattern detection process, there is demand for detecting detection objects of various sizes in an image, for example, a distant detection object and a near detection object. In this case, in a typical detection process, detection objects of a plurality of sizes are detected by applying a single discriminator capable of detecting a detection object of a reference size to images of a plurality of sizes. In this process, the detection objects are detected by enlarging or reducing images according to the sizes of the detection objects and applying a discriminator of a reference size to the enlarged or reduced images.

For example, Non-Patent Literature 1 discloses an improved detection process compared to the above-described detection process. In this process, detection objects of a plurality of sizes are detected by applying a single discriminator to images of a plurality of sizes. However, in this process, detection objects of some sizes are detected by enlarging or reducing images according to the sizes of the detection objects and applying a discriminator of a reference size to the enlarged or reduced images, and detection objects of the remaining sizes are detected using a discriminator of a reference size after the above-described enlarged or reduced images are corrected.

CITATION LIST

Non Patent Literature

[Non-Patent Literature 1] Piotr Dollar, Serge Belongie, and Pietro Perona. The Fastest Pedestrian Detector in the West. Proceedings of the British Machine Vision Conference, pages 68.1-68.11. BMVA Press, September 2010.

SUMMARY OF INVENTION

Technical Problem

However, in the above-described typical detection process, since a lot of time is required for the enlargement or reduction of the images and the calculation of the feature quantities of the enlarged or reduced images, it is not possible to accelerate the detection process. In the improved detection process, while the time required for the enlargement or reduction of the images and the calculation of the feature quantities of the enlarged or reduced images is reduced compared to the typical detection process, it is not possible to sufficiently accelerate the detection process.

Accordingly, the invention is to provide a discriminator generation device and a pattern detection device for accelerating a pattern detection process.

Solution to Problem

A discriminator generation device according to an embodiment of the invention includes an extraction unit which, using at least two pattern groups having patterns of different sizes for a detection object, extracts a feature quantity of the patterns configuring each pattern group, and a generation unit which generates a discriminator for detecting the detection object of a size corresponding to each pattern group in an image based on the feature quantity of the patterns configuring each pattern group. The sizes corresponding to a plurality of pattern groups may have an exponential relationship.

With this, since at least two discriminators for detecting detection objects of different sizes from images are generated, it is not necessary to enlarge or reduce the images when detecting detection objects of different sizes. Therefore, it is possible to generate a discriminator for accelerating a pattern detection process.

The discriminator generation device may further include a second generation unit which generates a discriminator for a pattern group of a size different from the size corresponding to each pattern group, in particular, for a pattern group of an intermediate size among sizes corresponding to a plurality of pattern groups based on the discriminator generated by the generation unit. With this, since it is possible to easily generate a discriminator for a pattern group different from the size corresponding to each pattern group, it is possible to accelerate a discriminator generation process.

The second generation unit may generate a discriminator by correcting a discrimination reference of the detection object by the discriminator generated by the generation unit, in particular, by correcting a determination threshold value of the feature quantity by the discriminator generated by the generation unit based on the size of the detection object. With this, it is possible to easily generate a discriminator based on the discriminator generated by the generation unit.

The discriminator may be configured as a strong discriminator in which weak discriminators are connected in multiple stages. The weak discriminators may be configured to determine the total value of the feature quantity of a region of an arbitrary size in the patterns. The weak discriminators may be configured to determine an arithmetic result of the total value of the feature quantity of a region of an arbitrary size in the patterns and the total value of the feature quantity of another region of an arbitrary size in the patterns. With this, it is possible to improve discrimination ability and discrimination speed.

The weak discriminators may be configured by combining the determination in a tree shape. With this, it is possible to improve discrimination accuracy by combining the determination of mutually associated feature quantities in a tree shape.

The patterns may have patterns of the detection object and patterns other than the detection object near or adjacent to the patterns of the detection object, and a discriminator which is used for detecting the detection object may be generated based on a pattern group having the patterns of the detection object and a pattern group having the patterns other than the detection object. It is preferable that, when the patterns of the detection object are pedestrian patterns, the patterns other than the detection object are road surface patterns. It is preferable that the patterns of the detection object and the patterns other than the detection object are gathered from the same image. With this, it is possible to improve discrimination accuracy taking into consideration the association with the patterns other than the detection object.

A pattern detection device according to an embodiment of the invention includes a detection unit which, using a discriminator for each pattern group generated by the generation unit of the above-described discriminator generation device, detects the detection object of a size corresponding to each pattern group from an image. The detection object is, for example, a pedestrian.

With this, since a plurality of discriminators are used so as to detect detection objects of different sizes from an image, it is not necessary to enlarge or reduce an image and it is possible to accelerate a pattern detection process.

The detection unit may detect the detection object of a size different from the size corresponding to each pattern group, in particular, the detection object of an intermediate size among sizes corresponding to a plurality of pattern groups using a discriminator generated based on the discriminator generated by the generation unit. With this, since it is possible to easily generate a discriminator for a pattern group of a size different from the size corresponding to each pattern group when generating a discriminator, it is possible to accelerate the discriminator generation process.

The pattern detection device may measure the distance from a region detected in the image using parallax obtained by a plurality of imaging devices and may control a range for detecting the detection object according to the measured distance. With this, it is possible to accelerate the pattern detection process taking into consideration the relationship between the size of the detection object and the distance.

Advantageous Effects of Invention

According to the invention, it is possible to provide a discriminator generation device and a pattern detection device for accelerating a pattern detection process.

BRIEF DESCRIPTION OF DRAWINGS

FIG. 1 is a schematic view showing the principle of a pattern detection process according to an embodiment of the invention.

FIG. 12 is a diagram showing a feature quantity distribution which is used for pattern detection.

FIG. 13 is a diagram showing an example of a pattern detection process.

FIG. 14 is a schematic view showing the principle of a pattern detection process according to the related art.

DESCRIPTION OF EMBODIMENTS

Figure 2:
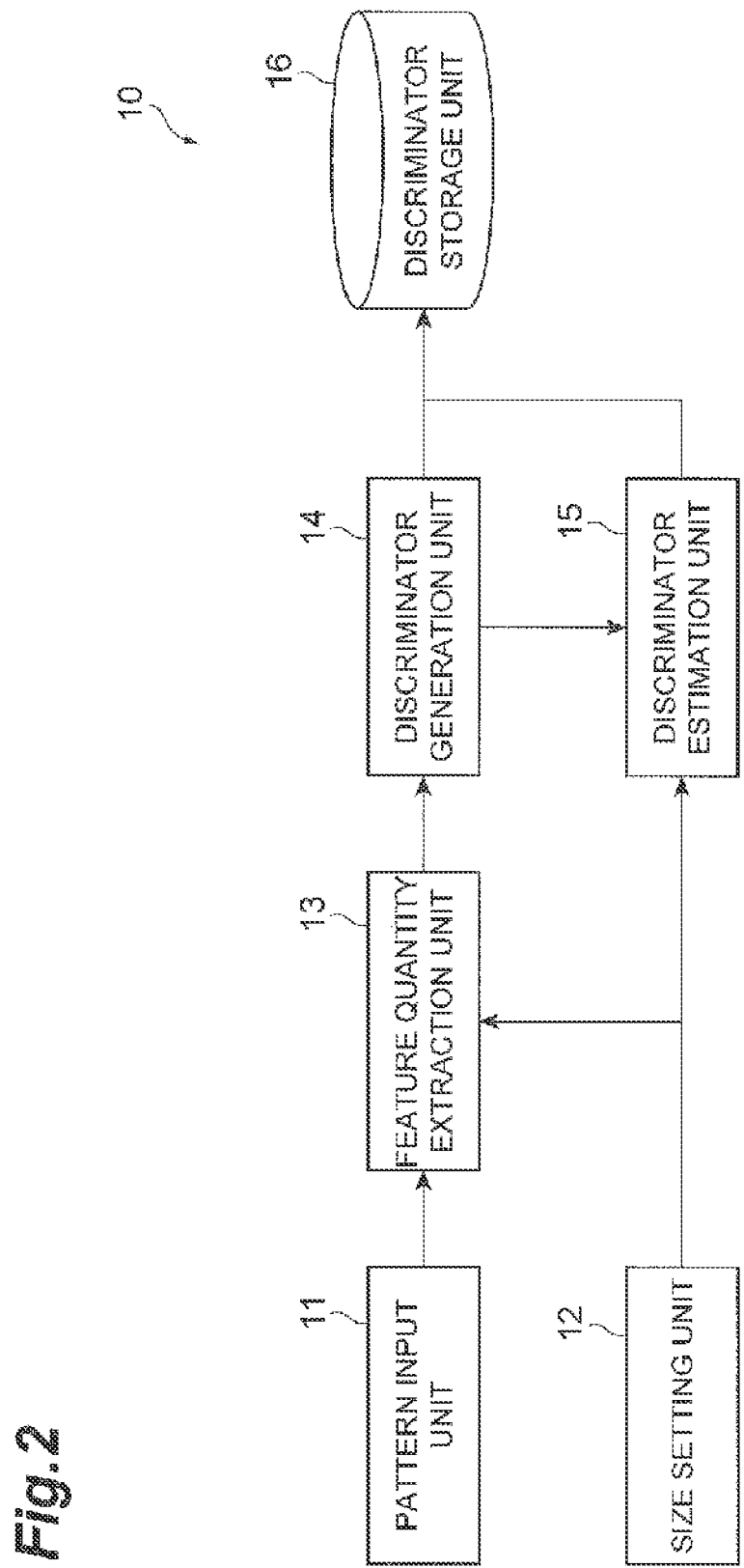
FIG. 2 is a block diagram showing the configuration of a discriminator generation device.

Hereinafter, an embodiment of the invention will be described in detail referring to the accompanying drawings. In the description of the drawings, the same elements are represented by the same reference numerals, and overlapping description will be omitted.

First, the principle of a pattern detection process according to the embodiment of the invention will be described referring to FIGS. 14 and 1 through comparison with the related art. Hereinafter, a case where detection objects of various sizes in an image I, in particular, pedestrians are detected will be described as an example.

FIG. 14(a) is a schematic view showing the principle of a typical pattern detection process of the related art. In this process, pedestrians of a plurality (N) of sizes are detected by applying a single discriminator C capable of detecting a pedestrian of a reference size to images I of a plurality (N) of sizes.

The pedestrian of the reference size is detected by applying the discriminator C of the reference size to the image I. A pedestrian other than the reference size is detected by enlarging or reducing the image I according to the size of the pedestrian and applying the discriminator C of the reference size to the enlarged or reduced image I. For example, a pedestrian of a size two times the reference size is detected by applying the discriminator C to a half-reduced image I reduced to half of the image I.

In this process, in order to detect pedestrians of a plurality of sizes, a plurality of images I corresponding to the pedestrians of a plurality of sizes are prepared and the feature quantity of each image I is calculated. Accordingly, a lot of time is required for the enlargement or reduction of the image I and the calculation of the feature quantity of the enlarged or reduced image I during pattern detection.

FIG. 14(b) is a schematic view showing the principle of an improved pattern detection process of the related art compared to the process of FIG. 14(a). In this process, pedestrians of a plurality (N) of sizes are detected by applying a single discriminator C capable of detecting a pedestrian of a reference size to images I of a plurality (N) of sizes.

Pedestrians of some sizes among a plurality of sizes are detected by applying the discriminator C of the reference size to the images I and the enlarged or reduced images I. Pedestrians of the remaining sizes are detected by correcting the images I and the enlarged or reduced images I and then applying the discriminator C of the reference size. For example, a pedestrian of a size 2.18 times the reference size is detected by correcting a half-reduced image I and then applying the discriminator C.

In this process, in order to detect pedestrians of a plurality of sizes, images I corresponding to pedestrians of some sizes are prepared and the feature quantity of each image I is calculated. Accordingly, it is possible to reduce the time required for the enlargement or reduction of the images I and the calculation of the feature quantities of the enlarged or reduced images I compared to the above-described process. However, in this process, a lot of time is required to prepare some images I and to calculate the feature quantity of each image I during pattern detection.

FIG. 1(a) is a schematic view showing the principle of the pattern detection process according to the embodiment of the invention. In this process, pedestrians of a plurality of sizes are detected by generating a plurality (N) of discriminators C capable of detecting pedestrians of a plurality (N) of sizes and applying a plurality (N) of discriminators C to a single image I. A discriminator C capable of detecting a pedestrian of a size x (x: arbitrary number) can detect pedestrians of sizes within a given allowable range from the size x along with the size x.

A plurality of discriminators C are generated based on a feature quantity so as to correspond to a plurality of sizes of pedestrians. Hereinafter, the discriminators C generated based on the feature quantity are referred to as main discriminators. That is, a pedestrian of a size x (x: arbitrary number) times the reference size is detected using a main discriminator corresponding to a pedestrian of a size x times the reference size. Hereinafter, the discriminator C corresponding to the pedestrian of a size x times the reference size is referred to as a discriminator C of an x-fold size. For example, a pedestrian of a size 2.18 times the reference size is detected by applying a discriminator C of a 2.18-fold size to the image I.

In this process, unlike the process of the related art, since a plurality of discriminators C are applied to the single image I, instead of applying the single discriminator C to a plurality of images a plurality of image I, less time is required for the enlargement or reduction of the image I and the calculation of the feature quantity of the enlarged or reduced image I. With this, it is possible to accelerate the pattern detection process. In this process, it is confirmed that it is possible to secure detection accuracy equal to or higher than the process of the related art.

FIG. 1(b) is a schematic view showing the principle of an improved pattern detection process according to the embodiment of the invention compared to the process of FIG. 1(a). In this process, by generating some (N' types) discriminators C (main discriminators) capable of detecting pedestrians of some (N' types; N'<N) sizes among a plurality (N types) of sizes and applying the discriminators C to a single image I, pedestrians of a plurality of sizes including the remaining (N–N' types) of sizes are detected.

The discriminators C (main discriminators) configuring a part of a plurality of discriminators are generated based on a feature quantity corresponding to some sizes of the pedestrians. The remaining discriminators C are generated based on the main discriminators corresponding to the remaining sizes of the pedestrians. Hereinafter, the discriminators C which are generated based on the main discriminators are referred to as sub discriminators. For example, a pedestrian of a size 2.18 times the reference size is detected by applying a sub discriminator of a 2.18-fold size generated based on main discriminator of a two-fold size to the image I.

In this process, similarly to the process of FIG. 1(a), since a plurality of discriminators C are applied to the single image I, less time is required for the enlargement or reduction of the image I and the calculation of the feature quantity of the enlarged or reduced image I. With this, it is possible to accelerate the pattern detection process. In this process, it is confirmed that it is possible to secure detection accuracy equal to or higher than the process of the related art.

Since the main discriminators configuring a part of a plurality of discriminators are generated based on the feature quantity, and the sub discriminators configuring the remaining discriminators are generated based on the main discriminators, it is possible to reduce the time required to generate the discriminators when generating the discriminators compared to the process of FIG. 1(a) for generating a plurality of main discriminators based on the feature quantity. In the process of FIG. 1(a), since a lot of time is required for the discriminator generation process, it is very important to provide a discriminator generation device for accelerating the discriminator generation process by the process of FIG. 1(b).

Next, the configuration of a discriminator generation device 10 according to an embodiment of the invention will be described referring to FIG. 2. FIG. 2 is a block diagram showing the configuration of the discriminator generation device 10 according to the embodiment of the invention.

The discriminator generation device 10 generates a plurality of discriminators (classifiers) which configure a pattern detection device 20. The pattern detection device 20 is a device which detects detection objects (objects) of various sizes in an image. A discriminator discriminates or determines a detection object candidate in an image as a detection object, and is realized by a program or the like.

As shown in FIG. 2, the discriminator generation device 10 includes a pattern input unit 11, a size setting unit 12, a feature quantity extraction unit (extraction unit) 13, a discriminator generation unit (generation unit) 14, a discriminator estimation unit (second generation unit) 15, and a discriminator storage unit 16.

The discriminator generation device 10 is a computer which primarily has a CPU, a ROM, a RAM, and the like, and is operated by a program. The pattern input unit 11, the size setting unit 12, the feature quantity extraction unit 13, the discriminator generation unit 14, the discriminator estimation unit 15, and the discriminator storage unit 16 may be configured by two or more computers.

The pattern input unit 11 receives a pattern group having a plurality of patterns for a detection object as input. The pattern input unit 11 receives a positive pattern group for a detection object and a negative pattern group for an object other than a detection object as input for use in generating a discriminator. The positive pattern group has images showing various pedestrians, that is, pedestrians having various body types, postures, and orientations, and the negative pattern group has images including no pedestrian. The input pattern groups are stored in a storage device (not shown) and read from the feature quantity extraction unit 13.

The size setting unit 12 sets the size of a plurality of discriminators configuring the pattern detection device 20. The sizes of the discriminators correspond to a plurality of sizes of the pedestrians to be a detection object. Hereinafter, a size to be a reference of a discriminator generation process is referred to as a reference size (for example, vertical 128 pixels×horizontal 64 pixels).

When the pattern detection device 20 is configured only by main discriminators (in case of FIG. 1(a)), the size setting unit 12 sets the size (main size) of a plurality of main discriminators. When the pattern detection device 20 is configured by combining main discriminators and sub discriminators (in case of FIG. 1(b)), the size setting unit 12 sets the sizes (main sizes) of main discriminators configuring a part of a plurality of discriminators and the sizes (sub sizes) of sub discriminators configuring the remaining discriminators.

The feature quantity extraction unit 13 extracts, using at least two pattern groups having patterns of different sizes for a detection object, a feature quantity of the patterns configuring each pattern group. The feature quantity extraction unit 13 extracts a feature quantity of patterns which are used to generate the main discriminators.

In order to generate the main discriminators, a feature quantity of patterns configuring a pattern group of a main size is extracted. The pattern group of the main size may be generated by enlarging or reducing the size of a pattern group input to the pattern input unit 11 to the main size or may be input as a pattern group of the main size in advance. The feature quantity is extracted for the patterns of each of the positive pattern group and the negative pattern group.

For example, in order to generate a discriminator of a reference size, a feature quantity of patterns configuring a pattern group of a reference size is extracted. Similarly, in order to generate a discriminator of a size two times the reference size, a feature quantity of patterns configuring a pattern group of a size two times the reference size is extracted. The extracted feature quantity is stored in a storage device (not shown) and read from the discriminator generation unit 14.

The feature quantity is a quantity representing a feature of a pattern (image), and is specified by a feature region, a feature index, and a feature index value. The feature region is a region representing a feature in a pattern, and is defined as, for example, a rectangular region of an arbitrary size. The feature index is an index representing the type of feature, and is, for example, an index, such as a luminance gradient (quantized orientation) in each direction, the magnitude (gradient magnitude) of the luminance gradient, or LUV color values. The feature index value is an arithmetic value (value of feature quantity) of a feature index in a feature region. As the feature quantity, for example, an Integral Channel Feature, a Haar-like feature, or the like is used.

The discriminator generation unit 14 generates a discriminator for detecting a detection object of a size corresponding to each pattern group based on a feature quantity of patterns configuring each pattern group. The discriminator generation unit 14 generates a main discriminator by applying the extraction result of the feature quantity to a learning algorithm.

The feature quantity of the patterns of each of the positive pattern group and the negative pattern group is applied to the learning algorithm. As the learning algorithm, for example, AdaBoost or the like is used. The main discriminator includes a discrimination reference which is defined by a feature region, a feature index, and a determination threshold value. The determination threshold value is a threshold value which is used for determination of pattern discrimination through comparison with a feature index value. The generation result of the main discriminator is supplied to the discriminator storage unit 16, and is also supplied to the discriminator estimation unit 15 when estimating a sub discriminator.

The discriminator estimation unit 15 generates (estimates) a discriminator for a pattern group of a size different from the size corresponding to each pattern group, in particular, for a pattern group of an intermediate size among sizes corresponding to a plurality of pattern groups based on the discriminator generated by the discriminator generation unit 14. The size corresponding to each pattern group is the size of the main discriminator.

The discriminator estimation unit 15 estimates a sub discriminator based on the main discriminator. The sub discriminator is generated by correcting a determination reference of the detection object by the main discriminator, specifically, by correcting the determination threshold value of the feature quantity by the main discriminator based on the size of the detection object. The sub discriminator is generated from a main discriminator of a size near the size of the sub discriminator. The generation result of the sub discriminator is supplied to the discriminator storage unit 16.

The discriminator storage unit 16 stores a plurality of discriminators configuring the pattern detection device 20. The discriminator storage unit 16 stores a plurality of main discriminators or main discriminators configuring a part of a plurality of discriminators and sub discriminators configuring the remaining discriminators. The stored discriminators are read from the discriminator storage unit 16 and used during pattern detection.

Next, the operation of the discriminator generation device 10 according to the embodiment of the invention will be described referring to FIGS. 3 to 9.

Figure 3:
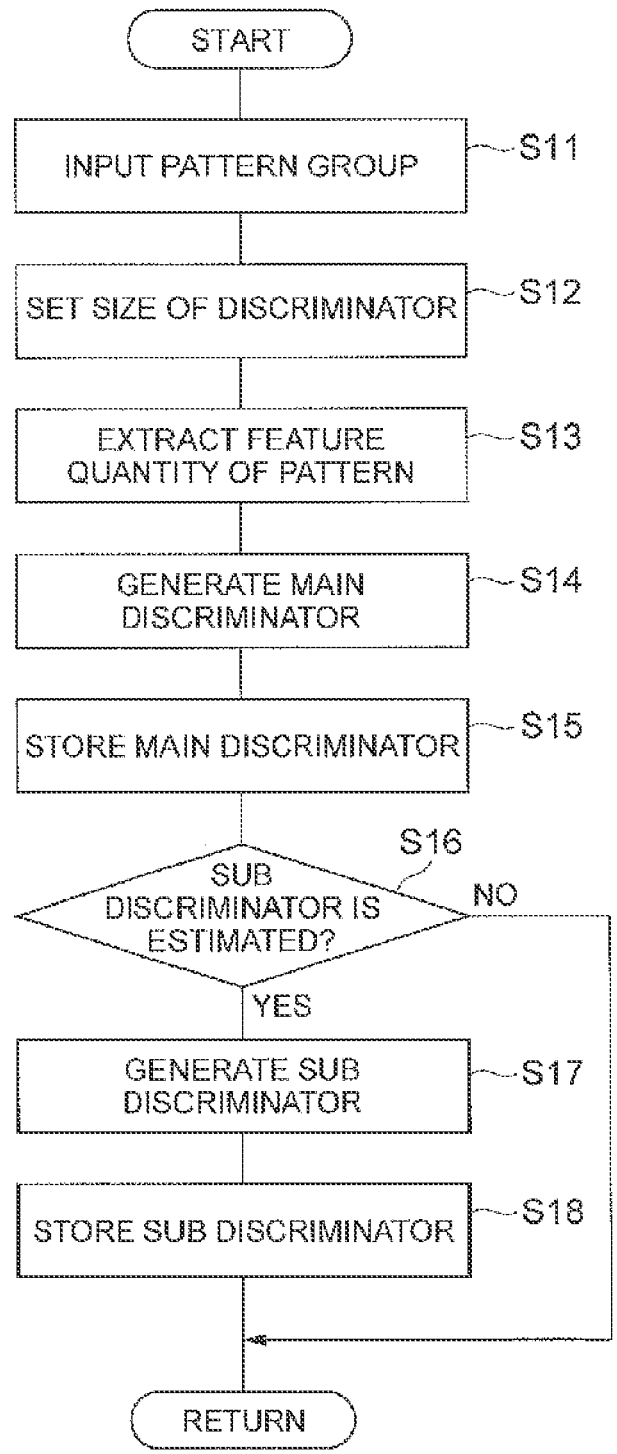
FIG. 3 is a flowchart showing the operation of the discriminator generation device.

FIG. 3 is a flowchart showing the operation of the discriminator generation device 10. The pattern input unit 11 receives a pattern group, which is used for discriminator generation, as input (Step S11). A pattern group having patterns of a reference size may be input to the pattern input unit 11, or a pattern group having patterns of a regular size or an irregular size may be input to the pattern input unit 11.

Figure 4:
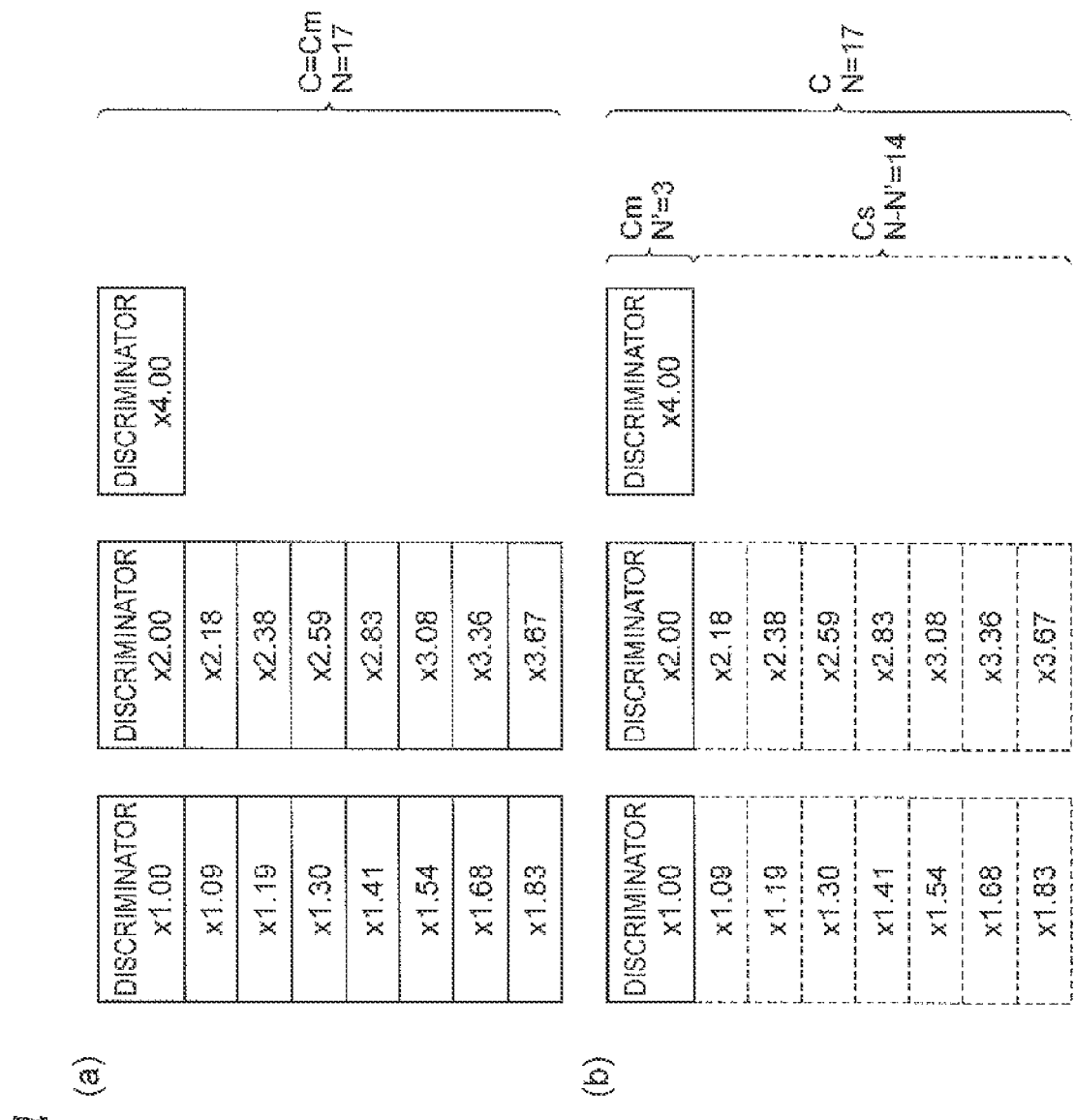
FIG. 4 is a diagram showing a configuration example of a discriminator in a pattern detection device.

The size setting unit 12 sets the size of a discriminator configuring the pattern detection device 20 (S12). FIG. 4 is a diagram showing a configuration example of a discriminator C in the pattern detection device 20.

As shown in FIG. 4(a), when the pattern detection device 20 is configured only by main discriminators Cm, the sizes (main sizes) of the main discriminators Cm are set as, for example, N=17 sizes in stages in a range of one to four times the reference size. For example, the main sizes have sizes one, two, and four times the reference size. The main sizes are further set as sizes (1.09, 1.19, 1.30, 1.41, 1.54, 1.68, 1.83 times) by eight divisions between one time and two times in geometric progression and sizes (2.18, 2.38, 2.59, 2.83, 3.08, 3.36, 3.67 times) by eight divisions between two times and four times in geometric progression. That is, the main sizes are set as sizes the eighth root of 2 in stages from the reference size to the size four times the reference size.

As shown in FIG. 4(b), when the pattern detection device 20 is configured by combining main discriminators Cm and sub discriminators Cs, the sizes (main sizes) of the main discriminators Cm are set as, for example, N'=3 sizes having an exponential relationship to be one, two, and four times the reference size. Similarly to FIG. 4(a), the sizes (sub sizes) of the sub discriminators Cs are set as N–N'=14 intermediate sizes by eight divisions in geometric progression between the respective sizes.

Returning to the description of FIG. 3, if the sizes of the discriminators are set, first, the size of the main discriminators are generated by a process of S13 and S14. The feature quantity extraction unit 13 extracts a feature quantity of the patterns (S13). The discriminator generation unit 14 generates a main discriminator based on the feature quantity of the patterns (S14). The main discriminator is generated by applying the extraction result of the feature quantity to a learning algorithm.

The feature quantity is set based on a learning result by the learning algorithm. The feature region is set as, for example, rectangular regions of various shapes or sizes in the patterns. The feature region is set as, for example, a region including a part of a pedestrian, and the feature index value is obtained as the total value of the index values (pixel values) in the feature region.

The feature region is set as, for example, a plurality of small rectangular regions of various shapes or sizes in the patterns. A plurality of small regions configuring the feature region may be set as regions of different shapes or sizes or may be set as regions separated from one another.

Figure 5:
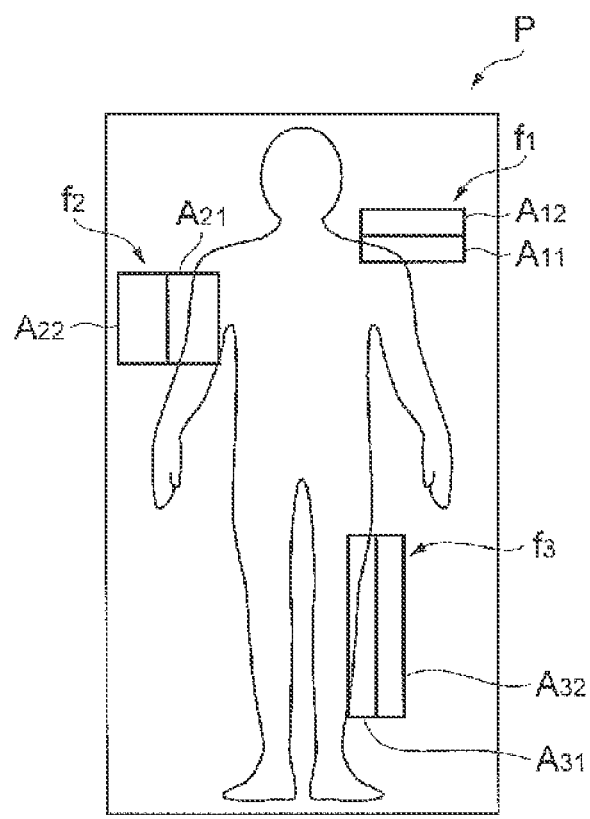
FIG. 5 is a diagram showing an example of a feature quantity.

FIG. 5 is a diagram showing an example of the feature quantity. In the example shown in FIG. 5, a feature region of a feature quantity $f_1$ is set as small regions $A_{11}$ and $A_{12}$. For example, the small region $A_{11}$ is set as a region including a part of a pedestrian, and the small region $A_{12}$ is set as a region including a background of a pedestrian. This setting reference is just an example, and the respective small regions $A_{11}$ and $A_{12}$ are set based on a learning result. In this case, the feature index value is obtained as the difference between the total values of the index values (pixel values) in the respective small regions $A_{11}$ and $A_{12}$ or other arithmetic results.

Figure 6:
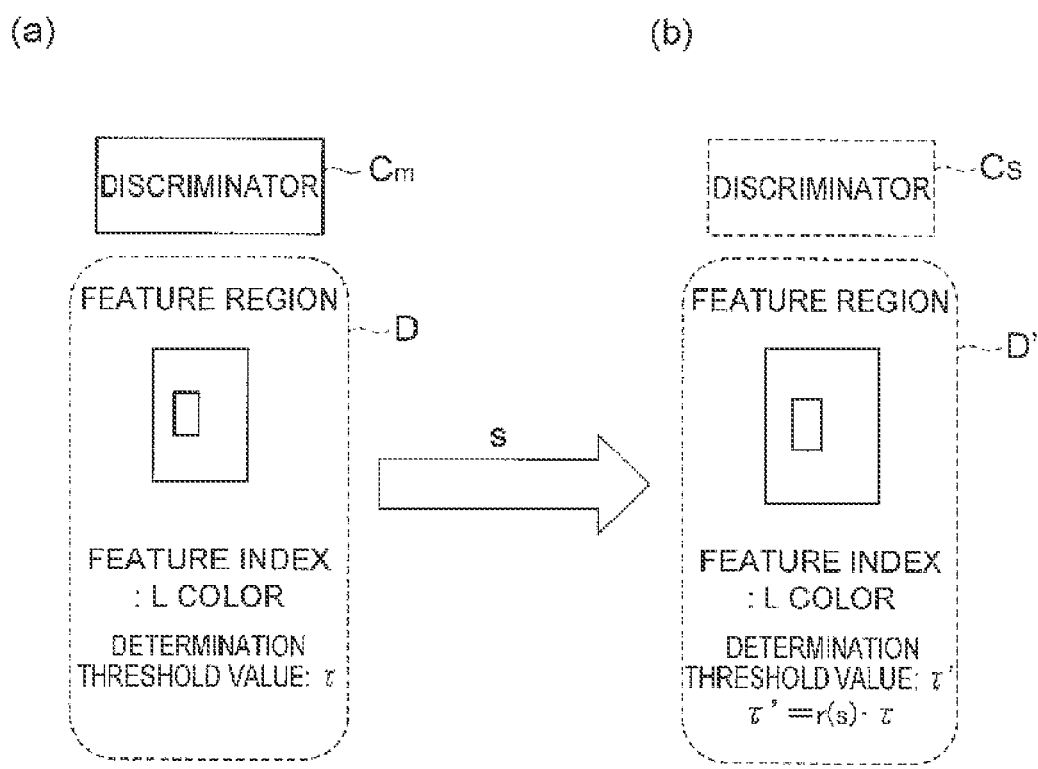
FIG. 6 is a diagram showing generation of a main discriminator and a sub discriminator.

FIG. 6 is a diagram showing generation of a main discriminator and a sub discriminator. As shown in FIG. 6(a), a main discriminator Cm includes a discrimination reference D which is defined by a feature region, a feature index, and a determination threshold value $\tau$. In the example shown in FIG. 6(a), as the discrimination reference D, a feature index (L color value) and a determination threshold value $\tau$ are defined along with a feature region (a region representing a feature in the patterns). The main discriminator Cm receives a feature quantity in an image for use in pattern detection, that is, in detection windows $Wd_1$ and $Wd_2$ (see FIG. 13) described below as input, and outputs the determination result (positive or negative) of the feature index value by the determination threshold value $\tau$.

Figure 7:
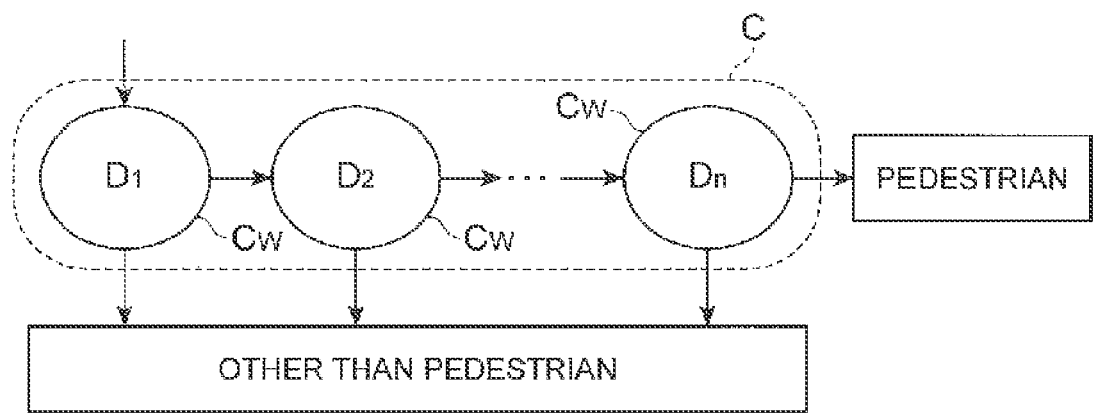
FIG. 7 is a diagram showing a discriminator in which weak discriminators are connected in multiple stages.
Figure 8:
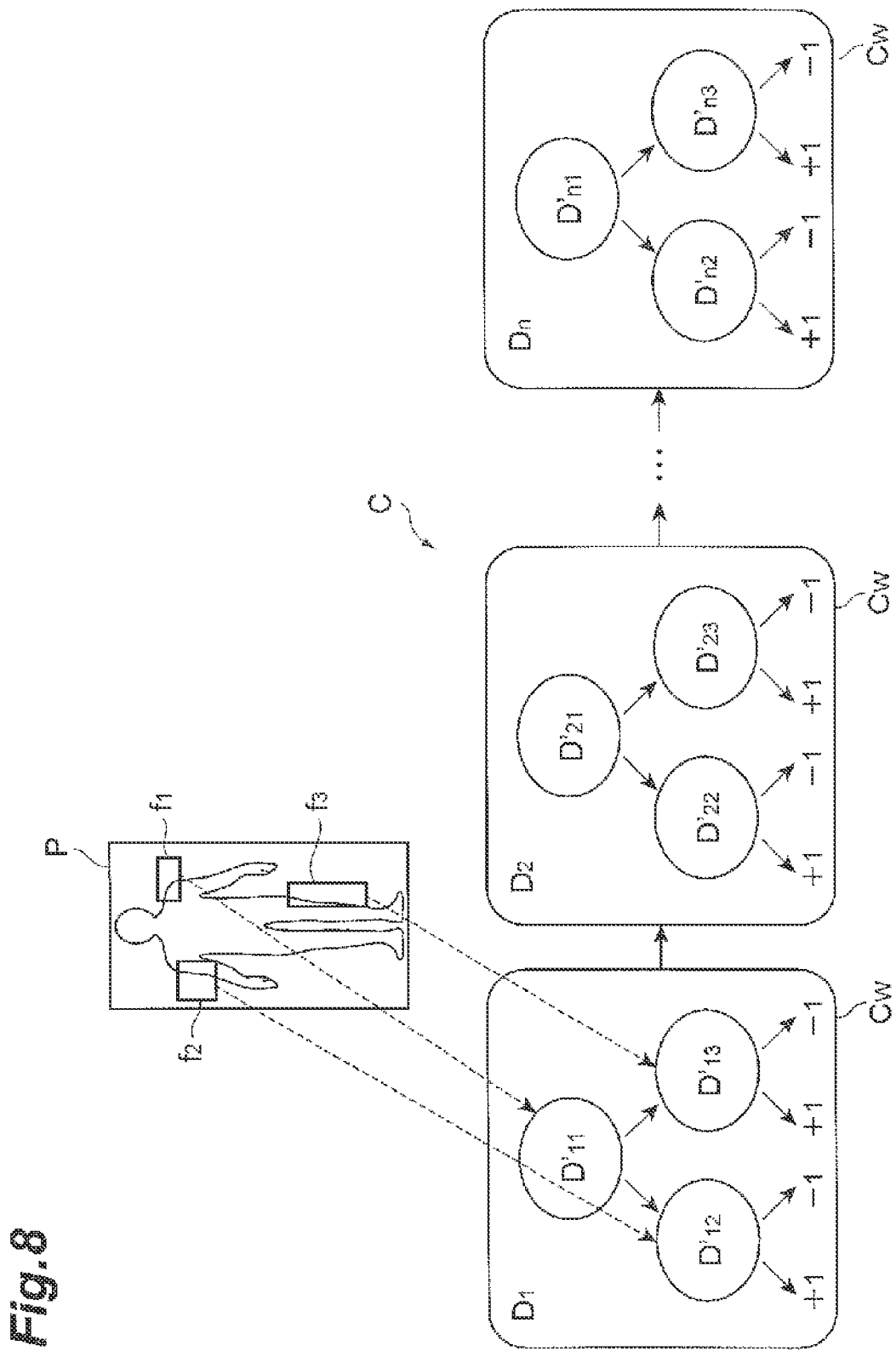
FIG. 8 is a diagram showing a discriminator in which weak discriminators having a tree structure are connected in multiple stages.
Figure 9:
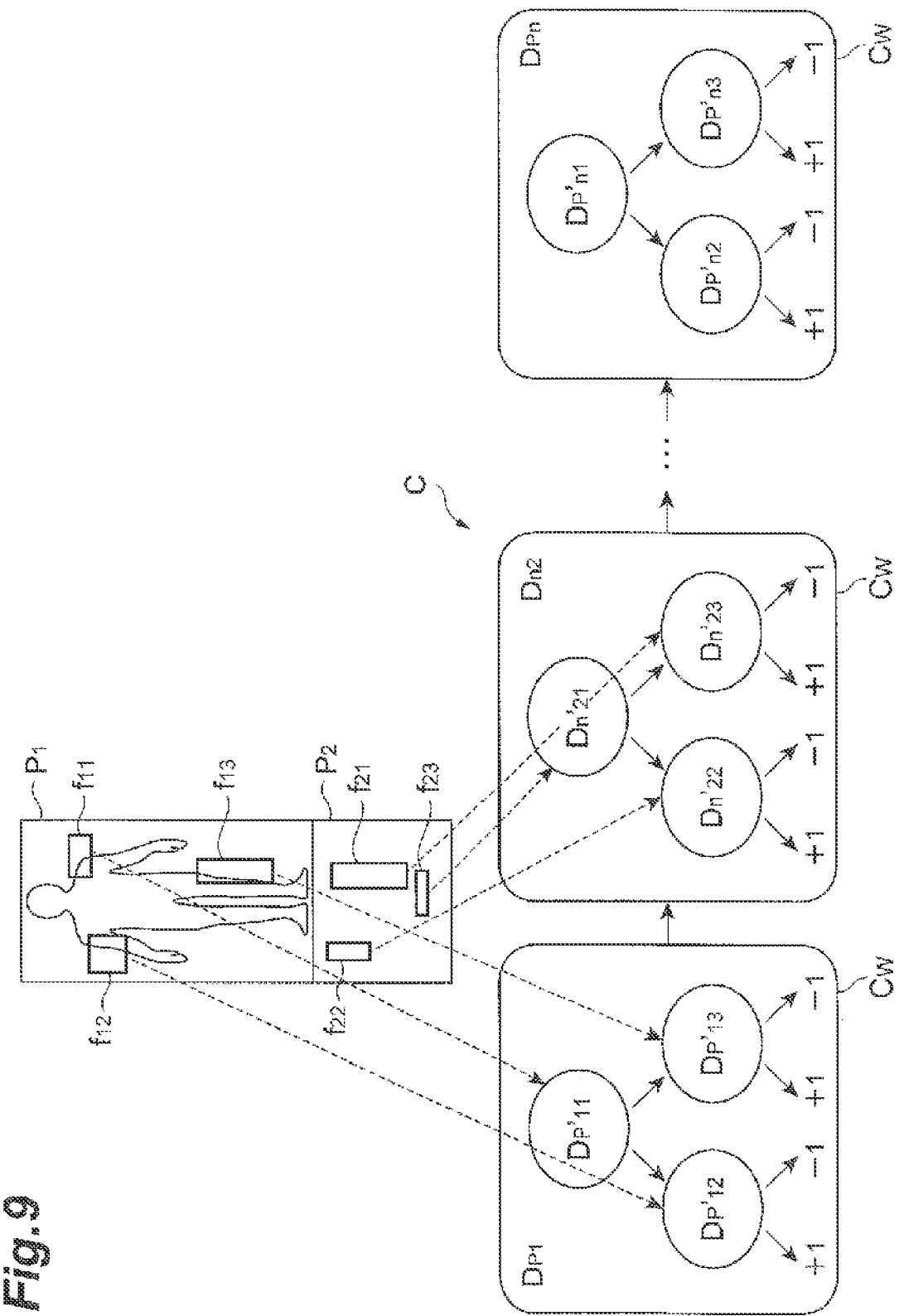
FIG. 9 is a diagram showing a discriminator taking into consideration a combination of a plurality of patterns.

Hereinafter, FIGS. 7 to 9 show a configuration example of a discriminator C, that is, a combination example in a base unit shown in FIG. 6. FIG. 7 is a diagram showing a discriminator C in which weak discriminators Cw are connected in multiple stages.

In the configuration example shown in FIG. 7, a discriminator (strong discriminator) configures a cascade in which n weak discriminators Cw having different discrimination references $D_1$ to $D_n$ are connected. Each discrimination reference D is defined by a feature region, a feature index, and a determination threshold value.

The pattern detection using the discriminator C is performed by sequentially applying the discrimination references $D_1$ to $D_n$ of the weak discriminators Cw to the image (an image in a detection window). For example, when the discrimination reference $D_1$ is satisfied and a discrimination reference $D_i$ ($1<i<n$) is not satisfied, discrimination is aborted and a negative response (other than a pedestrian) is generated, and when all of the discrimination references $D_1$ to $D_n$ are satisfied, a positive response (pedestrian) is generated. In this case, a weak discriminator Cw which discriminates a distinctive feature quantity in a detection object to be detected is arranged on the upstream side (the left side of FIG. 7), thereby improving discrimination speed by abortion of discrimination. The response of the discriminator C may be generated by weighting and adding the determination results of the discrimination references $D_1$ to $D_n$.

FIG. 8 is a diagram showing a discriminator C in which weak discriminators Cw having a tree structure are connected in multiple stages. In the configuration example shown in FIG. 8, the discriminator C (strong discriminator) is configured by connecting n weak discriminators Cw having different discrimination references $D_1$ to $D_n$. For example, the discrimination reference $D_1$ of the weak discriminator Cw is defined by combining the nested discrimination references $D_{11}'$ to $D_{13}'$. The nested discrimination references $D_{11}'$ to $D_{13}'$ are references for respectively discriminating feature quantities $f_1$ to $f_3$. The tree structure of the nested discrimination references D' is not limited to the example shown in FIG. 8.

The pattern detection using the discriminator C is performed by sequentially applying the discrimination references $D_1$ to $D_n$ of the weak discriminators Cw to the image (an image in a detection window). The determination result of the discrimination reference D is generated based on the determination results of the nested discrimination references D'. For example, the determination result of the discrimination reference $D_1$ is positive when the discrimination reference $D_{11}'$ is satisfied and the discrimination reference $D_{12}'$ is satisfied, and is negative when the discrimination reference $D_{11}'$ is not satisfied and the discrimination reference $D_{13}'$ is not satisfied. With this, it is possible to improve discrimination accuracy of the mutually associated feature quantities (for example, a feature quantity of a right foot and a feature quantity of a left foot of a pedestrian) using the nested discrimination references D'.

FIG. 9 is a diagram showing a discriminator C using a combination of a plurality of patterns. In the configuration example shown in FIG. 9, a plurality of patterns have a first pattern $P_1$ (for example, a pedestrian pattern) to be a detection object and a second pattern $P_2$ (for example, a road surface pattern) near or adjacent to the first pattern $P_1$. When generating a discriminator, it is desirable that the first pattern $P_1$ and the second pattern $P_2$ are gathered from the same image.

Similarly to FIG. 7, the discriminator C (strong discriminator) is configured by connecting n weak discriminators Cw having a tree structure. For example, nested discrimination references $Dp_{11}'$ to $Dp_{13}'$ of a discrimination reference $Dp_1$ are references for discriminating feature quantities $f_{11}$ to $f_{13}$ of the first pattern $P_1$, and nested discrimination references $Dn_{21}'$ to $Dn_{23}'$ of a discrimination reference $Dn_2$ are references for discriminating feature quantities $f_{21}$ to $f_{23}$ of the second pattern $P_2$. With this, it is possible to improve discrimination accuracy taking into consideration the association with the second pattern $P_2$ (for example, a pedestrian pattern and a pattern of a shadow of a pedestrian).

Returning to the description of FIG. 3, if the main discriminator is generated, the discriminator storage unit 16 stores the generated main discriminator (S15).

Next, when it is necessary to generate a sub discriminator (Yes in S16), a sub discriminator is generated by a process of S17. The discriminator estimation unit 15 generates a sub discriminator based on the main discriminator (S17). When it is not necessary to generate a sub discriminator (No in S16), the process ends.

Referring to FIG. 6 again, as shown in FIG. 6(b), a sub discriminator Cs is generated by correcting the discrimination reference D of the main discriminator Cm. That is, a feature region of the discrimination reference D is enlarged or reduced according to the size ratio s between the main discriminator Cm and the sub discriminator Cs. A determination threshold value $\tau$ is multiplied with a coefficient r, which is calculated as $r(s)=a \cdot s^b$ with parameters a and b, and is corrected to a determination threshold value $\tau'$. The parameters a and b are different according to whether or not the size ratio s exceeds 1, and are different according to the type of feature index.

In this embodiment, it is confirmed that it is possible to appropriately generate a sub discriminator of a size 0.5 to 2 times the size of a main discriminator. For example, a sub discriminator of a 2.18-fold size is generated from at least one of discriminators of sizes two times and four times a standard size. Theoretically, it is possible to appropriately generate a sub discriminator of a size less than 0.5 times or greater than two times the size of a main discriminator according to the type of feature quantity.

Accordingly, it is possible to appropriately generate a sub discriminator of a size close to a main size by making the main size of the main discriminator an exponential multiple, in particular, an exponential multiple of 2 to be 0.5, 1, 2, 4, 8 times, . . . , in particular, of a size between two main sizes. For example, when the pattern detection device 20 is configured as shown in FIG. 4(b), it is possible to appropriately generate the sub discriminator Cs of a size 0.5 to 8 times the reference size using the main discriminator Cm of sizes one, two, or four times the reference size.

Returning to the description of FIG. 3, if the sub discriminator is generated, the discriminator storage unit 16 stores the generated sub discriminator (S18).

With the above-described discriminator generation process, for example, when the discriminator C is configured as shown in FIG. 4(a), a feature quantity of patterns configuring a pattern group of a main size is extracted, and a plurality (N=17) of main discriminators Cm corresponding to the respective sizes are generated based on the extraction result of the feature quantity.

When the discriminator C is configured as shown in FIG. 4(b), a feature quantity of patterns configuring a pattern group of a main size is extracted, and (N'=3; <N) main discriminators Cm corresponding to the main size are generated based on the extraction result of the feature quantity. (N−N'=14) sub discriminators Cs corresponding to sub sizes are generated based on the main discriminators Cm of the main sizes adjacent to the respective sub sizes.

As described above, with the discriminator generation device 10 according to the embodiment of the invention, since at least two discriminators for detecting detection objects of different sizes from an image are generated, it is not necessary to enlarge or reduce the image when detecting detection objects of different sizes. Accordingly, it is possible to generate a discriminator for accelerating the pattern detection process.

A discriminator for a pattern group of a size different from the size corresponding to each pattern group, in particular, for a pattern group of an intermediate size among the sizes corresponding a plurality of pattern groups is generated based on a discriminator of the size corresponding to each pattern group, whereby it is possible to easily generate discriminators corresponding to these sizes. Therefore, it is possible to accelerate a discriminator generation process.

A discriminator is configured by connecting weak discriminators in multiple stages, whereby it is possible to improve discrimination accuracy. The weak discriminators are configured to determine the feature quantity total value of a region of an arbitrary size in the patterns or an arithmetic result of feature quantity total values of two regions, whereby it is possible to improve discrimination speed.

The determination is combined in a tree shape to configure the weak discriminators, whereby it is possible to improve discrimination accuracy by combining the determination of mutually associated feature quantities in a tree shape.

A discriminator is configured to discriminate the patterns of the detection object based on patterns of the detection object and patterns other than the detection object near or adjacent to the patterns, whereby it is possible to improve discrimination accuracy taking into consideration the association with the patterns other than the detection object.

Next, the configuration of the pattern detection device 20 according to the embodiment of the invention will be described referring to FIG. 10.

The pattern detection device 20 is a device which detects detection objects of various sizes in an image. The pattern detection device 20 is mounted in, for example, a vehicle, a robot, or the like including an image input device, such as a camera.

Figure 10:
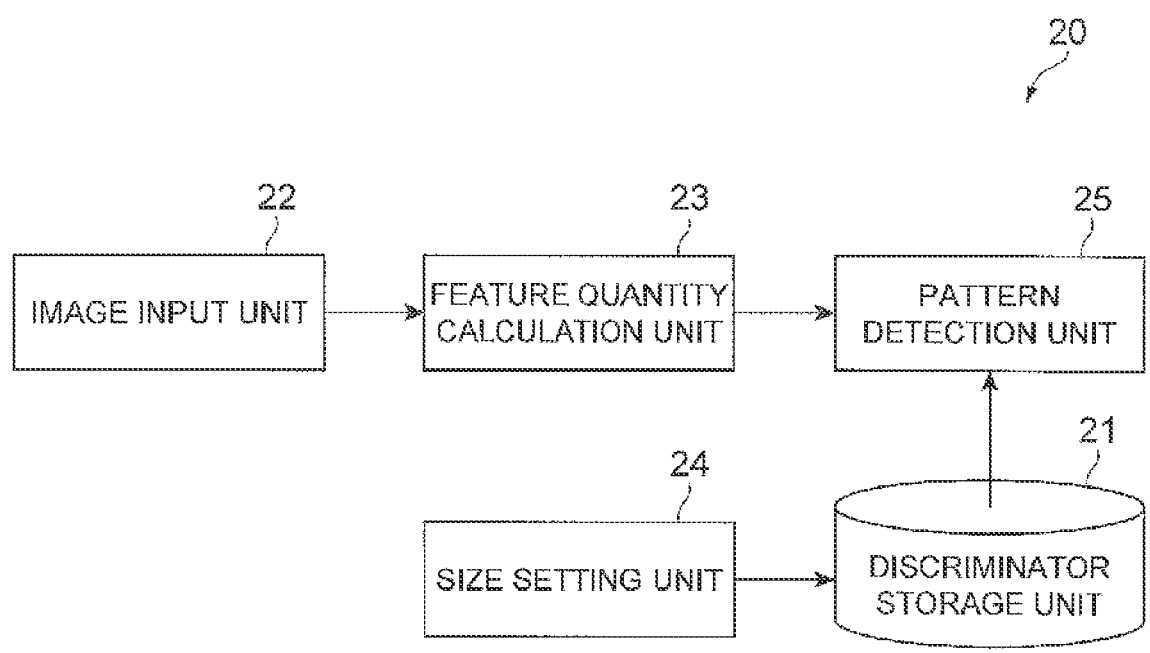
FIG. 10 is a block diagram showing the configuration of a pattern detection device.

FIG. 10 is a block diagram showing the configuration of the pattern detection device 20. As shown in FIG. 10, the pattern detection device 20 includes a discriminator storage unit 21, an image input unit 22, a feature quantity calculation unit 23, a size setting unit 24, and a pattern detection unit (detection unit) 25.

The pattern detection device 20 is a computer which primarily has a CPU, a ROM, a RAM, and the like, and is operated by a program. The discriminator storage unit 21, he image input unit 22, the feature quantity calculation unit 23, the size setting unit 24, and the pattern detection unit 25 are may be configured by two or more computers.

The discriminator storage unit 21 stores a plurality of discriminators which configure the pattern detection device 20. The discriminator storage unit 21 stores a plurality of main discriminators, or main discriminators which configure a part of a plurality of discriminators and sub discriminators which configure the remaining discriminators. A plurality of discriminators are prepared by the discriminator generation device 10 of FIG. 2 and stored.

The image input unit 22 receives an image for pattern detection as input. For example, the image is an image showing a place for pattern detection, a road on which there is a pedestrian. The input image is supplied to the feature quantity calculation unit 23.

The feature quantity calculation unit 23 calculates a feature quantity of the image which is used for pattern detection. For example, the feature quantity of the image is obtained as the distribution (feature quantity distribution) of index values, such as a luminance gradient of each direction, the magnitude of the luminance gradient, and the LUV color values. The calculation result of the feature quantity is stored in a storage device (not shown) and read from the pattern detection unit 25.

The size setting unit 24 sets the sizes of discriminators which are used for pattern detection. For example, the sizes of the discriminators are set in an order, such as an ascending order, a descending order, main size priority, or sub size priority.

The pattern detection unit 25 detects a detection object of a size corresponding to each pattern group from an image using a discriminator for each pattern group generated by the discriminator generation unit 14 of the discriminator generation device 10. The pattern detection unit 25 detects a detection object of a size different from the size corresponding to each pattern group, in particular, of an intermediate size among the sizes corresponding to a plurality of pattern groups using the discriminator generated based on the discriminator for each pattern group generated by the discriminator generation unit 14.

The pattern detection unit 25 applies discriminators of various sizes to an image and detects a detection object by pattern recognition. The pattern detection unit 25 reads a discriminator of a set size from the discriminator storage unit 21 and applies the discriminator to the image. When the response (result of pattern recognition) of the discriminator to the image is positive, a pedestrian is detected.

Next, the operation of the pattern detection device 20 according to the embodiment of the invention will be described referring to FIGS. 11 to 13.

Figure 11:
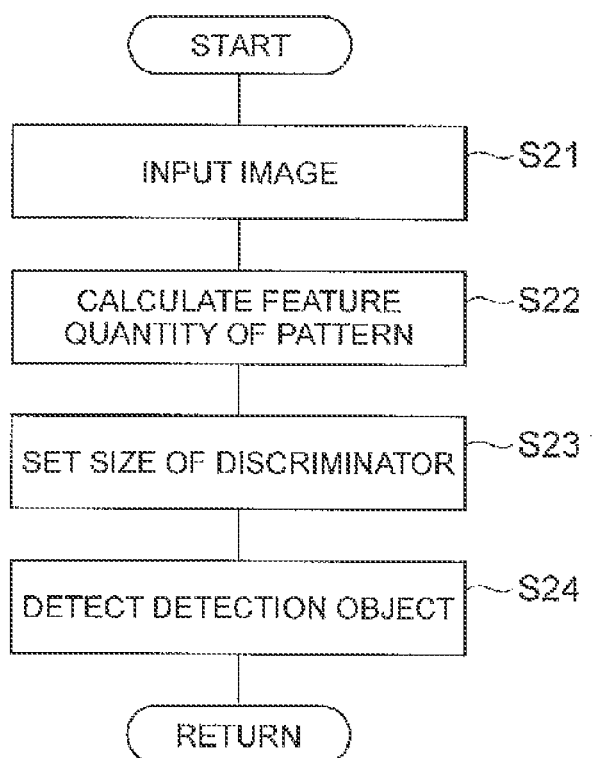
FIG. 11 is a flowchart showing the operation of the pattern detection device.

FIG. 11 is a flowchart showing the operation of the pattern detection device 20. As shown in FIG. 11, the image input unit 22 receives an image for pattern detection as input (Step S21).

The feature quantity calculation unit 23 calculates a feature quantity of the image which is used for pattern detection (S22). It is preferable that a feature quantity distribution Df shown in FIG. 12 representing a distribution of a feature index is generated from the image which is used for pattern detection.

FIG. 12 is a diagram showing the feature quantity distribution Df. In the feature quantity distribution Df shown in FIG. 12, as shown in FIG. 12(*a*), a value of an arbitrary point p in an image represents the total value (integral value) of pixel values in an upper left region of the point p. If regions A, B, C, and D shown in FIG. 12(*b*) are assumed, the total value of the pixels in the region D of the image are calculated as follows referring to the regions A to D.

That is, a pixel value 1 on the lower right of the region A in the feature quantity distribution Df represents the total value of the pixels of the region A in the image. Similarly, a pixel value 2 on the lower right of the region B represents the total value of the pixels of the region A+B, a pixel value 3 on the lower right of the region C represents the total value of the pixels of the region A+C, and a pixel value 4 on the lower right of the region D represents the total value of the pixels of the region A+B+C+D. Accordingly, the total value of the pixels in the region D of the image is easily calculated as 4+1−(2+3).

Returning to the description of FIG. 11, if the feature quantity is calculated, the size setting unit 24 sets the sizes of the discriminators which are used for pattern detection (S23). For example, the size setting unit 24 sets a plurality (N=17) of sizes the eighth root of 2 in stages from the reference size to the size four times the reference size.

The pattern detection unit 25 applies discriminators of various sizes to an image and detects a detection object by pattern recognition (S24). The pattern detection is performed by shifting a detection window corresponding to the size of a discriminator on the image vertically and horizontally and applying the discrimination reference of the detection object to the region of the detection window. For example, in the pattern detection, a discriminator of a certain size may be applied to the entire region of the image and then a discriminator of a subsequent size may be applied, or the discriminators may be applied to the entire region of the image while changing the sizes.

When applying the discrimination reference, a feature region or each small region (see FIG. 5) in the feature region is regarded as the region D of FIG. 12(*b*), whereby it is possible to easily obtain the total value of the index values of the feature region or the respective small regions from the feature quantity distribution.

With the above-described pattern detection process, the reference size is set, and as shown in FIG. 13(*a*), a detection window Wd of the reference size is shifted on an image I vertically and horizontally and applied to the entire region of the image I. In the example shown in FIG. 13(*a*), a distant pedestrian $Pd_1$ is detected using a discriminator of the reference size.

Next, a size 1.09 times the reference size is set, and a detection window 1.09 times the reference size is shifted on the image I vertically and horizontally and applied to the entire region of the image I. Hereinafter, similarly, discriminators 1.19 times, 1.30 times, . . . , and four times the reference size are applied. In the example shown in FIG. 13(*b*), a near pedestrian $Pd_2$ is detected using a discriminator 1.54 times the reference size. With this, it is possible to detect pedestrians of N=17 sizes (including a size in a give allowable range from each size) on the image I in a range of one to four times the reference size.

The pattern detection device 20 may be configured to apply pattern detection only in a specific range, instead of the entire range on the image. For this reason, the distance from a region detected in an image may be measured, a range for detecting the detection object may be controlled according to the measured distance. For example, in the distance measurement, parallax obtained by a plurality of cameras is used. The size of a discriminator for a region to be detected may be controlled based on the distance measurement result, or detection may be omitted.

As described above, with the pattern detection device 20 according to the embodiment of the invention, since a plurality of discriminators are used to detect detection objects of different sizes from the image, it is not necessary to enlarge or reduce the image, and it is possible to accelerate the pattern detection process.

Since it is possible to easily generate a discriminator for a pattern group of a size different from the size corresponding to each pattern group, in particular, for a pattern group of an intermediate size among the sizes corresponding to a plurality of pattern groups, it is possible to accelerate a discriminator generation process.

A range for detecting a detection object is controlled according to the distance from a region to be detected in the image, whereby it is possible to accelerate the pattern detection process taking into consideration the relationship between the size of the detection object and the distance.

The above-described embodiment has described the best embodiment of the discriminator generation device and the pattern detection device according to the embodiment of the invention, the discriminator generation device and the pattern detection device according to the embodiment of the invention are not limited to those described in this embodiment. The discriminator generation device and the pattern detection device according to the embodiment of the invention may be made by modifying the discriminator generation device and the pattern detection device according to this embodiment or applying the discriminator generation device and the pattern detection device according to this embodiment to other devices without departing from the scope and spirit of the invention described in the appended claims.

For example, in the above description, although a case where a pedestrian is detected from a normal image using the principle of the invention has been described, a detection object other than a pedestrian may be detected from the image, or a pedestrian or a detection object other than a pedestrian may be detected from other images, such as an infrared image or a distance image.

REFERENCE SIGNS LIST

10: discriminator generation device, 11: pattern input unit, 12: size setting unit, 13: feature quantity extraction unit, 14: discriminator generation unit, 15: discriminator estimation unit, 16: discriminator storage unit, 20: pattern detection device, 21: discriminator storage unit, 22: image input unit, 23: feature quantity calculation unit, 24: size setting unit, 25: pattern detection unit, C: discriminator, Cm: main discriminator, Cs: sub discriminator, Cw: weak discriminator, I: image.

The invention claimed is:

1. A discriminator generation device comprising:
    an extraction unit which, using at least two pattern groups having patterns of different sizes for a detection object, extracts a feature quantity of the patterns configuring each pattern group; and
    a first generation unit which generates a first discriminator for detecting the detection object of a size corresponding to each pattern group in an image based on the feature quantity of the patterns configuring each pattern group; and
    a second generation unit which generates a second discriminator for a pattern group of a size different from the size corresponding to each pattern group based on the first discriminator generated by the first generation unit,
    wherein the second generation unit multiplies a determination threshold value of the feature quantity by a coefficient and corrects the determination threshold value of the feature quantity by the first discriminator generated by the first generation unit based on the size of the detection object.

2. The discriminator generation device according to claim 1,
    wherein the second generation unit generates a second discriminator for a pattern group of an intermediate size among sizes corresponding to a plurality of pattern groups.

3. The discriminator generation device according to claim 1,
    wherein the sizes corresponding to the plurality of pattern groups have an exponential relationship.

4. The discriminator generation device according to claim 1,
    wherein the first or second discriminator is configured as a strong discriminator in which relatively weaker discriminators are connected in multiple stages.

5. The discriminator generation device according to claim 4,
    wherein the relatively weaker discriminators are configured to determine the total value of the feature quantity of a region of an arbitrary size in the patterns.

6. The discriminator generation device according to claim 4,
    wherein the relatively weaker discriminators are configured to determine an arithmetic result of the total value of the feature quantity of a region of an arbitrary size in the patterns and the total value of the feature quantity of another region of an arbitrary size in the patterns.

7. The discriminator generation device according to claim 5,
    wherein the relatively weaker discriminators are configured by combining the determination in a tree shape.

8. The discriminator generation device according to claim 1,
    wherein the patterns have patterns of the detection object and patterns other than the detection object near or adjacent to the patterns of the detection object, and
    the first or second discriminator which is used for detecting the detection object is generated based on a pattern group having the patterns of the detection object and a pattern group having the patterns other than the detection object.

9. The discriminator generation device according to claim 8,
    wherein, when the patterns of the detection object are pedestrian patterns, the patterns other than the detection object are road surface patterns.

10. The discriminator generation device according to claim 9,
    wherein the patterns of the detection object and the patterns other than the detection object are gathered from the same image.

11. The discriminator generation device according to claim 1, further comprising a pattern detection device, said pattern detection device comprising:
    a detection unit which, using a discriminator for each pattern group generated by the first generation unit, detects the detection object of a size corresponding to each pattern group from an image,
    wherein the detection unit detects the detection object of a size different from the size corresponding to each pattern group using a discriminator generated based on the discriminator generated by the second generation unit.

12. The pattern detection device according to claim 11,
    wherein the detection unit detects the detection object of an intermediate size among sizes corresponding to a plurality of pattern groups.

13. The pattern detection device according to claim 11,
    wherein the distance from a region detected in the image is measured using parallax obtained by a plurality of imaging devices, and
    a range for detecting the detection object is controlled according to the measured distance.

14. The pattern detection device according to claim 11,
    wherein the detection object is a pedestrian.

* * * * *